US006954246B2

(12) United States Patent
Kim et al.

(10) Patent No.: US 6,954,246 B2

(45) Date of Patent: Oct. 11, 2005

(54) LIQUID CRYSTAL DISPLAY

(75) Inventors: Il-Gon Kim, Suwon-si (KR); Jang-Kun Song, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 42 days.

(21) Appl. No.: 10/780,001

(22) Filed: Feb. 17, 2004

(65) Prior Publication Data

US 2004/0160560 A1 Aug. 19, 2004

(30) Foreign Application Priority Data

Feb. 17, 2003 (KR) .................................... 2003-0009788

(51) Int. Cl.[7] ...................... G02F 1/1337; G02F 1/1343

(52) U.S. Cl. ....................................... 349/129; 349/141

(58) Field of Search ................................. 349/129, 141

(56) References Cited

U.S. PATENT DOCUMENTS 6,850,302 B2 * 2/2005 Song .......................... 349/129

* cited by examiner

*Primary Examiner*—James A. Dudek

(74) *Attorney, Agent, or Firm*—F. Chau & Associates, LLC

(57) ABSTRACT

Pixel electrodes are located opposite a data line and have cutouts, and a common electrode has cutouts facing the pixel electrodes. The cutouts of the pixel electrodes and the common electrode define domains. The cutouts of the common electrode have portions overlapping the data line and the overlapping portions of the cutouts of the common electrode are alternately arranged along the data line.

7 Claims, 8 Drawing Sheets

LIQUID CRYSTAL DISPLAY

BACKGROUND OF THE INVENTION (a) Field of the Invention

The present invention relates to a liquid crystal display.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

The LCD also includes a plurality of switching elements for applying voltages to the field-generating electrodes and a plurality of signal lines such as gate lines and data lines connected to the switching elements. The signal lines make capacitive coupling with other signal lines and the common electrode, which serves as a load exerted on the signal lines to yield signal delay as well as their own resistances. In particular, the coupling between the data lines and the common electrode drives liquid crystal molecules disposed therebetween to cause light leakage near the data lines, thereby deteriorating the light leakage. In order to prevent the light leakage, a black matrix may be wide to reduce the aperture ratio.

SUMMARY OF THE INVENTION

A liquid crystal display is provided, which includes: a first substrate; a gate line formed on the first substrate; a data line formed on the first substrate and intersecting the gate line; first and second pixel electrodes located opposite the data line and having a plurality of first cutouts; a thin film transistors connected to the gate line, the data line, and the first pixel electrode; a second substrate facing the second substrate; and a common electrode formed on the second substrate and having a plurality of second and third cutouts defining a plurality of domains along with the first cutouts and facing the first and the second pixel electrodes, respectively, wherein the second and the third cutouts have portions overlapping the data line and the overlapping portions of the second and the third cutouts are alternately arranged along the data line.

Preferably, the second and the third cutouts are alternately arranged with the first cutouts of the first and the second pixel electrodes.

The domains may have two long edges extending substantially parallel to each other and make an angle of about 45 degrees with the gate line.

The second cutouts may include upper cutouts facing upper half of the first pixel electrode and lower cutouts facing lower half of the first pixel electrode, and at least one of the number of the upper cutouts and the number of the lower cutouts may be odd.

A liquid crystal display is provided, which includes: a first substrate; a gate line formed on the first substrate and extending substantially in a first direction; a gate insulating layer formed on the gate line; a semiconductor layer formed on the gate insulating layer; first and second ohmic contacts formed on the semiconductor layer; a data line formed on the first substrate, extending in a second direction, and including a source electrode disposed on the first ohmic contact at least in part; a drain electrode formed on the second ohmic contact at least in part; a passivation layer formed on the data line and the drain electrode and having a contact hole exposing the drain electrode; first and second pixel electrodes formed on the passivation layer and having a plurality of first cutouts, the first pixel electrode connected to the drain electrode through the contact hole; a second substrate facing the first substrate; a plurality of color filters formed on the second substrate; and a common electrode formed on the color filters and having a plurality of second and third cutouts defining a plurality of domains along with the first cutouts and facing the first and the second pixel electrodes, respectively, wherein the second and the third cutouts have portions overlapping the data line, each of the second and the third cutouts include upper cutouts facing upper half of the first or the second pixel electrodes and lower cutouts facing lower half of the first or the second pixel electrodes, and the number of the upper cutouts and the number of the lower cutouts are odd.

The overlapping portions of the second and the third cutouts may be alternately arranged along the data line.

The liquid crystal display may further include a storage electrode line located on the same plane as the gate line and overlapping the first and the second pixel electrodes.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
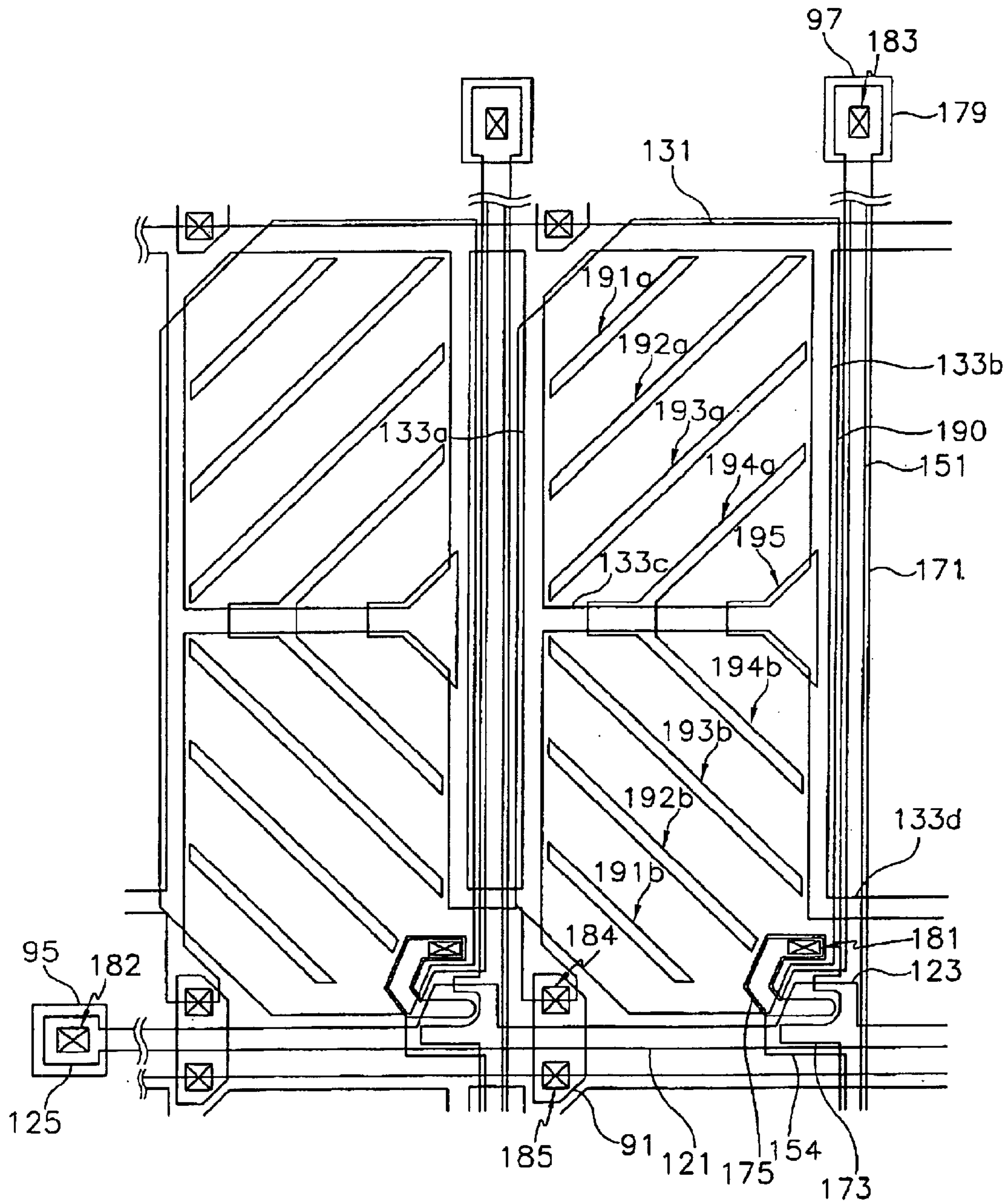
FIG. 1 is a layout view of a TFT array panel of an LCD according to an embodiment of the present invention.

The present invention now will be described more fully hereinafter with reference to the accompanying drawings, in which embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

Figure 2:
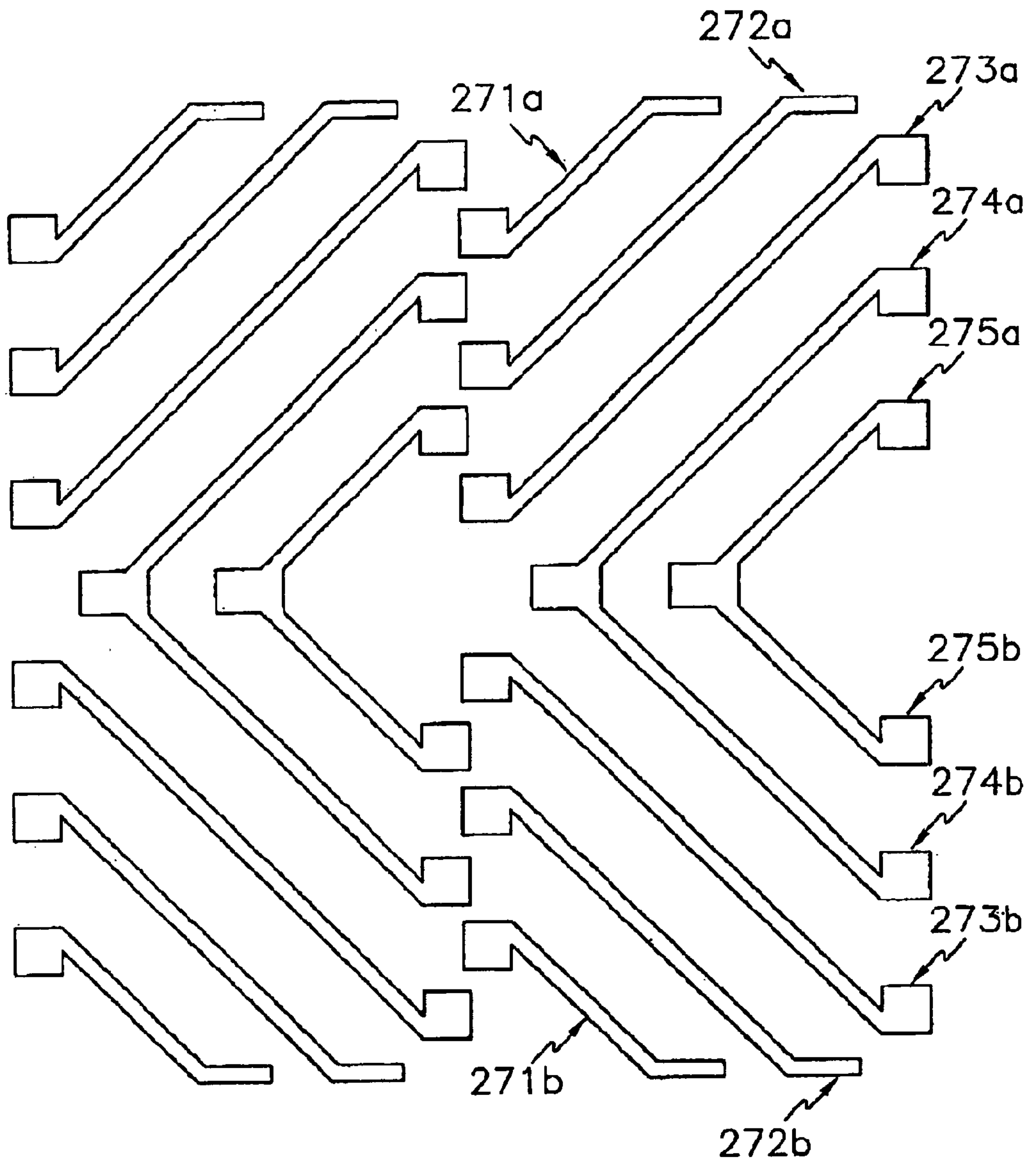
FIG. 2 is a layout view of cutouts of a common electrode panel 200 of an LCD according to an embodiment of the present invention.
Figure 3:
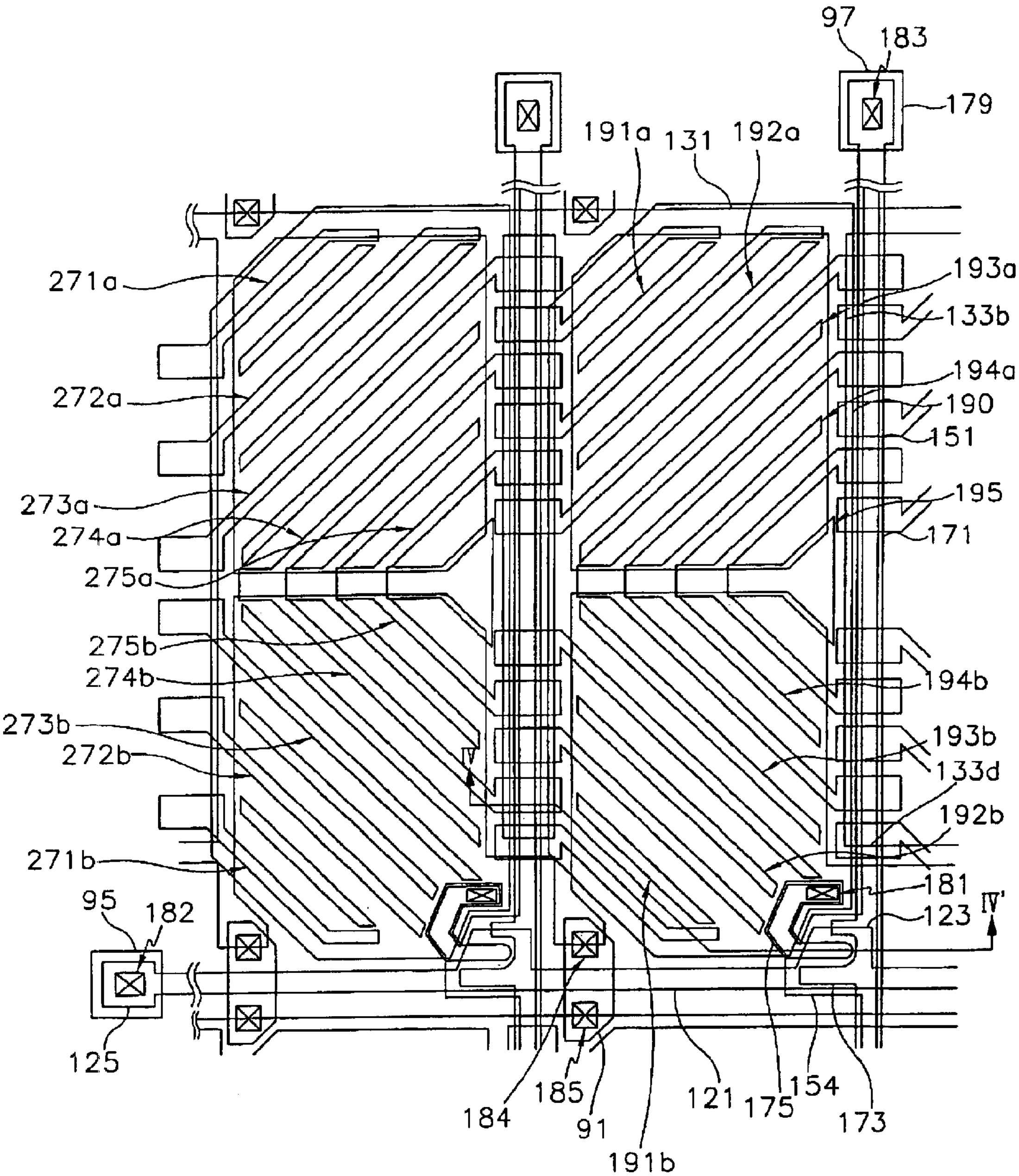
FIG. 3 is a layout view of an LCD including the TFT array panel shown in FIG. 1 and the common electrode panel shown in FIG. 2.
Figure 4:
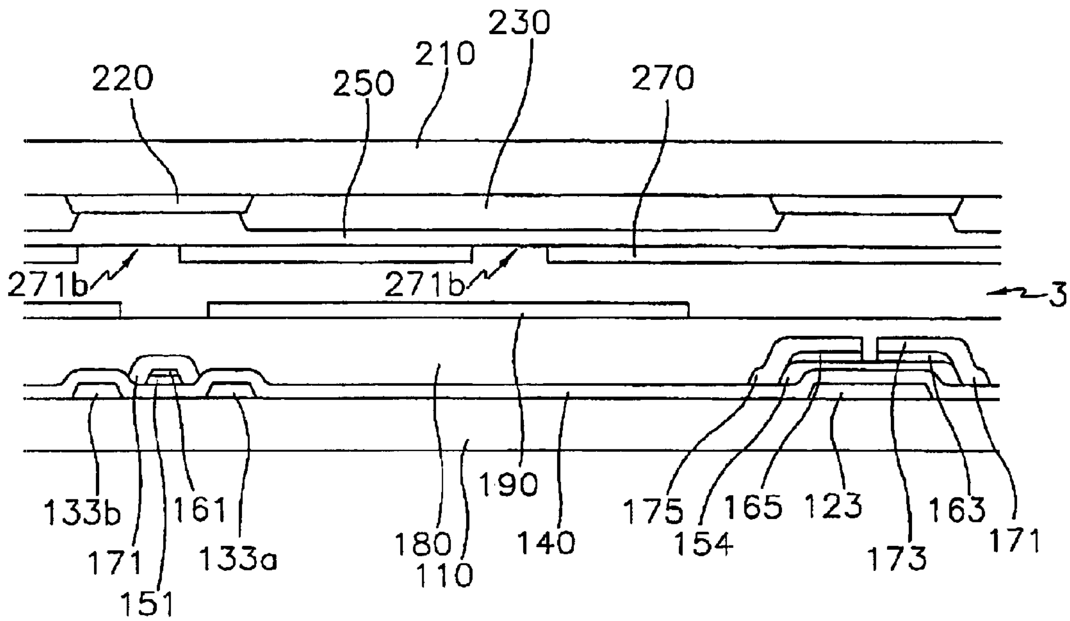
FIG. 4 is a sectional view of the LCD shown in FIG. 3 taken along the line IV—IV'.

FIG. 1 is a layout view of a TFT array panel of an LCD according to an embodiment of the present invention, FIG. 2 is a layout view of cutouts of a common electrode panel 200 of an LCD according to an embodiment of the present invention, FIG. 3 is a layout view of an LCD including the TFT array panel shown in FIG. 1 and the common electrode panel shown in FIG. 2, and FIG. 4 is a sectional view of the LCD shown in FIG. 3 taken along the line IV—IV'.

An LCD according to an embodiment of the present invention includes a TFT array panel 100, a common electrode panel 200, and a LC layer 3 interposed between the panels 100 and 200 and containing a plurality of LC molecules aligned vertical to surfaces of the panels 100 and 200.

The TFT array panel 100 is now described in detail with reference FIGS. 1 and 4.

A plurality of gate lines 121 and a plurality of storage electrode lines 131 are formed on an insulating substrate 110.

The gate lines 121 extend substantially in a transverse direction and are separated from each other and transmit gate signals. Each gate line 121 includes a plurality of projections forming a plurality of gate electrodes 123 and an end portion having a larger width for connection with an external driving circuit.

Each storage electrode line 131 extends substantially in the transverse direction and includes a plurality of sets of two longitudinal branches forming first and second storage electrodes 133*a* and 133*b* and a transverse branch forming a third storage electrode 133*c* connected between the first storage electrode 133*a* and the second storage electrode 133*b*, and a plurality of electrode connections 133*d* connecting the second storage electrodes 133*b* and the first storage electrodes 133*a* in adjacent sets of the branches 133*a*–133*c*. Each of the first storage electrodes 133*a* has a free end portion and a fixed end portion connected to the storage electrode line 131, and both of the end portions have inclined edges. Each of the third storage electrodes 133*c* forms a mid-line between two adjacent gate lines 121 and it has an isosceles-triangular end portion connected to the second storage electrode 133*b*. The storage electrode lines 131 are supplied with a predetermined voltage such as a common voltage, which is applied to a common electrode 270 on the other panel 200 of the LCD.

The gate lines 121 and the storage electrode lines 131 is preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may have a multi-layered structure including two films having different physical characteristics, a lower film (not shown) and an upper film (not shown). The upper film is preferably made of low resistivity metal including Al containing metal such as Al and Al alloy for reducing signal delay or voltage drop in the gate lines 121 and the storage electrode lines 131. On the other hand, the lower film is preferably made of material such as Cr, Mo and Mo alloy, which has good contact characteristics with other materials such as indium tin oxide (ITO) or indium zinc oxide (IZO). A good exemplary combination of the lower film material and the upper film material is Cr and Al—Nd alloy.

In addition, the lateral sides of the gate lines 121 and the storage electrode lines 131 are tapered, and the inclination angle of the lateral sides with respect to a surface of the substrate 110 ranges about 20–80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") are formed on the gate insulating layer 140. Each semiconductor stripe 151 extends substantially in the longitudinal direction and has a plurality of projections 154 branched out toward the gate electrodes 123.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are tapered, and the inclination angles thereof are preferably in a range between about 30–80 degrees.

A plurality of data lines 171 and a plurality of drain electrodes 175 separated from the data lines 171 are formed on the ohmic contacts 161 165 and the gate insulating layer 140.

The data lines 171 for transmitting data voltages extend substantially in the longitudinal direction and intersect the gate lines 121 and the storage electrode lines 131 as well as the electrode connections 133*d*. Each data line 171 is disposed between the first and the second storage electrodes 133*a* and 133*b* in adjacent sets of the branches 133*a*–133*c* of the storage electrode lines 131 and it includes an end portion 179 having wider width for contact with another layer or an external device. A plurality of branches of each data line 171, which project toward the drain electrodes 175, form a plurality of source electrodes 173. Each drain electrode 175 is curved to form a half circle and each source electrode 173 is curved to partly enclose an end portion of the drain electrode 175. A gate electrode 123, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of refractory metal such as Mo containing metal, Cr or Al containing metal and they may also include a lower film (not shown) preferably made of Mo, Mo alloy or Cr and an upper film (not shown) located thereon and preferably made of Al containing metal.

Like the gate lines 121 and the storage electrode lines 131, the data lines 171 and the drain electrodes 175 have tapered lateral sides, and the inclination angles thereof range about 30–80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 as described above, to smooth the profile of the surface, thereby preventing the disconnection of the data lines 171.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si:O:F formed by plasma enhanced chemical vapor deposition (PECVD), or inorganic material such as silicon nitride.

The passivation layer 180 has a plurality of contact holes 181 and 183 exposing the end portions of the drain electrodes 175 and the end portions 179 of the data lines 171, respectively. The passivation layer 180 and the gate insulating layer 140 have a plurality of contact holes 182, 184 and 185 exposing the end portions 125 of the gate lines 121, the free end portions of the first storage electrodes 133*a*, and portions of the storage electrode lines 131 near the fixed end portions of the first storage electrodes 133*a*, respectively. The contact holes 184 and 185 also expose portions of the substrate 110, but it is optional.

A plurality of pixel electrodes 190, a plurality of contact assistants 95 and 97, and a plurality of storage connections 91, which are preferably made of ITO or IZO, are formed on the passivation layer 180.

The pixel electrodes 190 are physically and electrically connected to the drain electrodes 175 through the contact holes 181 such that the pixel electrodes 190 receive the data voltages from the drain electrodes 175.

The pixel electrodes 190 supplied with the data voltages generate electric fields in cooperation with the common electrode 270, which reorient liquid crystal molecules in the liquid crystal layer 3.

A pixel electrode 190 and the common electrode 270 form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131 including the storage electrodes 133*a*–133*c*.

Each pixel electrode 190 is chamfered near both the end portions of the first storage electrode 133*a* and the chamfered edges of the pixel electrode 190 are substantially parallel to the inclined edges of the end portions of the first storage electrode 133*a* and they make an angle of about 45 degrees with the gate lines 121.

Each pixel electrode 190 has a plurality of upper cutouts 191*a*–194*a*, lower cutouts 191*b*–194*b*, and a center cutout 195, which partition the pixel electrode 190 into a plurality of partitions. The upper and the lower cutouts 191*a*–194*a* and 191*b*–194*b* are disposed at upper and lower halves of the pixel electrode 190 interposing the third storage electrode 133*c*, respectively, and the center cutout 195 is located substantially on the triangular end portion of the third storage electrode 133*c* located between the upper and the lower halves of the pixel electrode 190. The upper and the lower cutouts 191*a*–194*a* and 191*b*–191*b* make an angle of about 45 degrees to the gate lines 121, and the upper cutouts 191*a*–194*a*, which extend substantially parallel to each other and to the chamfered upper edge of the pixel electrode 190, extend substantially perpendicular to the lower cutouts 191*b*–194*b*, which extend substantially parallel to each other and to the chamfered upper edge of the pixel electrode 190.

The cutouts 191*a* and 191*b* extend approximately from a longitudinal edge of the pixel electrode 190 approximately to transverse edges of the pixel electrode 190. The cutouts 192*a* and 192*b* extend approximately from the longitudinal edge of the pixel electrode 190 approximately to the unchamfered corners of the pixel electrode 190. The cutouts 193*a* and 193*b* extend approximately from the corners of the upper and lower halves of the pixel electrode 190 approximately to another longitudinal edge of the pixel electrode 190. The cutouts 194*a* and 194*b* extend approximately from the center line of the pixel electrode 190 approximately to the another longitudinal edge of the pixel electrode 190 and they meet on the third storage electrode 133*c* to form a transverse branch extending along the third storage electrode 133*c*. The center cutout 195 also extend along the third storage electrode 133*c* and has inclined edges substantially parallel to the lateral edges of the triangular end portion of the third storage electrode 133*c* and to the upper and lower cutouts 191*a*–194*a* and 191*b*–194*b*.

Accordingly, the upper half of the pixel electrode 190 is partitioned into five upper partitions by the upper cutouts 191*a*–194*a*, and the lower half of the pixel electrode 190 is also partitioned into five lower partitions by the lower cutouts 191*b*–194*b*. The number of partitions or the number of the cutouts is varied depending on the design factors such as the size of pixels, the ratio of the transverse edges and the longitudinal edges of the pixel electrodes, the type and characteristics of the liquid crystal layer 3, and so on.

The contact assistants 95 and 97 are connected to the end portions 125 of the gate lines 121 and the end portions 179 of the data lines 171 through the contact holes 182 and 183, respectively. The contact assistants 95 and 97 are not requisites but preferred to protect the end portions 125 and 179 and to complement the adhesiveness of the end portions 125 and 179 and external devices.

The storage connections 91 cross over the gate lines 121 and they are connected to the exposed portions of the storage electrode lines 131 and the exposed end portions of the first storage electrodes 133*a* through the contact holes 185 and 184 opposite each other with respect to the gate lines 121, respectively.

The description of the common electrode panel 200 follows with reference to FIGS. 2–4.

A black matrix 220 for preventing light leakage is formed on an insulating substrate 210 such as transparent glass and the black matrix 220 includes a plurality of openings facing the pixel electrodes 190 and having substantially the same shape as the pixel electrodes 190. The black matrix 220 preferably includes a Cr film and a CrOx film, but it may be made of organic material including black die.

A plurality of red, green and blue color filters 230 are formed substantially in the openings of the black matrix 220 and an overcoat 250 is formed on the color filters 230.

A common electrode 270 preferably made of transparent conductive material such as ITO and IZO is formed on the overcoat 250.

The common electrode 270 has a plurality of sets of upper and lower cutouts 271*a*–275*a* and 271*b*–275*b*. The cutouts

271*a*–275*a* and 271*b*-275*b* are disposed between the cutouts 191*a*–194*a*, 191*b*–194*b* and 195 and the chamfered edges of the pixel electrode 190 and the distances between adjacent cutouts 271*a*–275*a*, 271*b*–275*b*, 191*a*–194*a*, 191*b*–194*b* and 195 and the distances between the cutouts 271*a* and 271*b* and the chamfered edges of the pixel electrode 190 are substantially the same.

Each cutout 271*a*–275*a* or 271*b*–275*b* has at least one expanded end portion overlapping the data lines 171. The longest cutouts 273*a* and 273*b* have two expanded end portions while remaining cutouts 271*a*, 272*a*, 274*a*, 275*a*, 271*b*, 272*b*, 274*b* and 275*b* have one expanded end portions. The cutouts 271*a*, 272*a*, 271*b* and 271*b* extend approximately from a longitudinal edge of the pixel electrode 190 approximately to transverse edges of the pixel electrode 190 and their expanded edges are located near the longitudinal edges of the pixel electrode 190 while their other edges are curved to extend in the transverse direction. The cutouts 274*a*, 274*b*, 275*a* and 275*b* extend approximately from the center line of the pixel electrode 190 approximately to the another longitudinal edge of the pixel electrode 190 and they meet at the center line of the pixel electrode 190 to form transverse branches extending along the center line and arranged alternate with the transverse branch of the cutouts 194*a* and 194*b* and the center cutout 195 of the pixel electrode 190.

A homeotropic alignment layer (not shown) is coated on the inner surface of each panel 100 or 200, and a pair of polarizers (not shown) are provided on outer surfaces of the panels 100 and 200 such that their polarization axes are crossed and one of the transmissive axes is parallel to the gate lines 121.

The LCD may further include at least one retardation film for compensating the retardation of the LC layer 3.

The LC molecules in the LC layer 3 are aligned such that their long axes are vertical to the surfaces of the panels 100 and 200. The liquid crystal layer 3 has negative dielectric anisotropy.

The cutouts 191*a*–194*a*, 191*b*–194*b*, 195, 271*a*–275*a* and 271*b*–275*b* controls the tilt directions of the LC molecules in the LC layer 3. That is, the liquid crystal molecules in each region called domain defined by adjacent cutouts 191*a*–194*a*, 191*b*–194*b*, 195, 271*a*–275*a* and 271*b*–275*b* or by the cutout 271*a* or 271*b* and the chamfered edge of the pixel electrode 190 are tilted in a direction perpendicular to the extension direction of the cutouts 191*a*–194*a*, 191*b*–194*b*, 195, 271*a*–275*a* and 271*b*–275*b*. It is apparent that the domains have two long edges extending substantially parallel to each other and making an angle of about 45 degrees with the gate line.

The expanded end portions of the cutouts 271*a*–275*a* and 271*b*–275*b*, which are aligned with the data lines 171, separated from each other, and arranged alternately, reduce the delay of the data voltages flowing in the data lines 171, which is generated by the parasitic capacitance formed by the overlap of the common electrode 270 and the data lines 171. The expanded end portions also decreases the variation of the capacitance of the liquid crystal capacitor due to the data voltages carried by the data lines and lateral light leakage due to the crosstalk of the data signals. The reduction of the lateral light leakage enables to decrease the width of the black matrix 220.

The number of the upper cutouts 271*a*–275*a* or the lower cutouts 271*b*–271*b* is five, and it may be varied depending on the design factors. For example, the number of the upper cutouts 271*a*–275*a* or the lower cutouts 271*b*–271*b* is odd in consideration of symmetry. That is, the longest cutout has two expanded end portions, and remaining cutouts are symmetrical arranged with respect to the longest cutout.

The load exerted on the data line due to the parasitic capacitance with and without the common electrode is described in detail with reference to FIG. 5.

Figure 5:
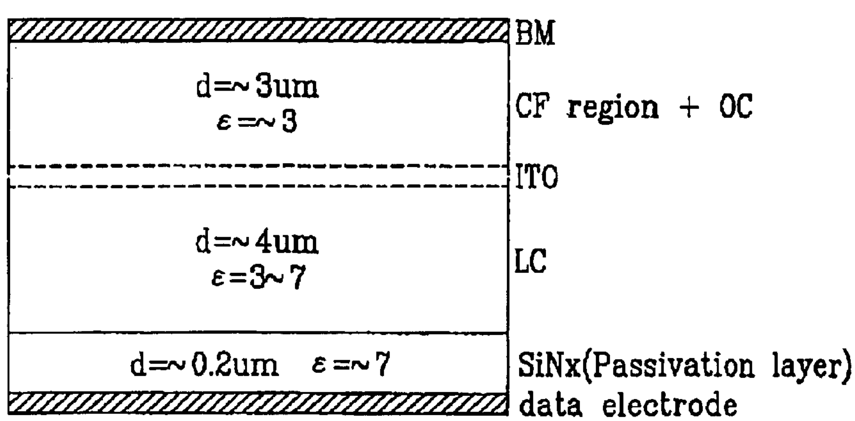
FIG. 5 is a schematic sectional view of the LCD shown in FIG. 4.

FIG. 5 is a schematic sectional view of the LCD shown in FIG. 4.

The dielectric constant $\epsilon$ and the thickness d of the color filter 230 and the overcoat 250 are about 3 and 3 microns, respectively. The dielectric constant $\epsilon$ of the liquid crystal layer 3 varies from about 3, when the liquid crystal molecules are aligned parallel to the substrates 110, to about 7 when the liquid crystal molecules are aligned perpendicular to the substrates 110. The thickness of the liquid crystal layer 3 is about 4 microns. The dielectric constant $\epsilon$ and the thickness d of the passivation layer 180 made of SiNx are about 7 and 0.2 microns, respectively. The black matrix 220 made of metal is electrically connected to the common electrode 270.

With the common electrode 270, the orientations of the liquid crystal molecules vary its maximum range. That is, the dielectric constant $\epsilon$ of the liquid crystal layer 3 varies from about 3 to about 7. Ignoring the passivation layer 180, the parasitic capacitance given by $A\times\epsilon/d$, where A is the area of the data line 171, varies from $A\times 3/4=0.75A$ to $A\times 7/4=1.75A$.

Without the common electrode 270, the liquid crystal layer 3 is assumed to be supplied with a voltage equal to about half of that with the common electrode 270 since the thickness and the dielectric constant of the color filter 230 and the overcoat 250 are similar to those of the liquid crystal layer 3. Accordingly, the dielectric constant of the liquid crystal layer 3 may vary from about 3 to about 4. Accordingly, the parasitic capacitance between the black matrix 220 and the data line 171 varies from about $A\times 3/7=0.43A$ to about $A\times 4/7=0.57A$.

Therefor, the ratio of the average parasitic capacitance without the common electrode 270 to the average parasitic capacitance with the common electrode 270 is equal to about $(0.43+0.57)/(0.75+1.75)=0.4$. That is, the parasitic capacitance without the common electrode 270 is reduced to about 40% compared with that with the common electrode 270.

If the black matrix 220 is made of insulating material such as organic insulating material, there is no capacitance between the black matrix 220 and the common electrode 270.

Concerning the expanded end portions of the cutouts 271*a*–275*a* and 271*b*–275*b* overlapping the data line 171, the remaining portions of the common electrode 270 make the parasitic capacitance with the data line 171, which may be about quarter of that in the case without the overlapping portions.

In the meantime, other signal lines also make the parasitic capacitance with the data line, which may be about half of the total parasitic capacitance.

TABLE 1

| type of black matrix | without overlapping portions of cutouts | with overlapping portions of cutouts |
|---|---|---|
| organic | 1 | 0.5 (other signal wire) + 0.5 × 0.25 (remaining portions of common electrode) = 0.63 |
| Cr | 1 | 0.5 (other signal wire) + 0.5 × 0.25 (remaining portions of common electrode) + 0.5 × 0.73 × 0.4 (black matrix) = 0.78 |

Table 1 illustrates that the parasitic capacitance is reduced by about 40% for organic black matrix and about 20% for Cr black matrix.

The structures according to embodiments of the present invention reduce longitudinal crosstalk, which is described in detail.

The decrease of the load on the data line increases the charging ratio of the data voltages in the pixel electrode, thereby decreasing the longitudinal crosstalk. In addition, the removal of the portions of the common electrode decreases the strength of the electric field near the data line and thus it decreases the fluctuation of the orientations of the liquid crystal molecules disposed on the data lines. Accordingly, the variation of the load on the data line due to the fluctuation of the orientations of the liquid crystal molecules is reduced to decrease the longitudinal crosstalk. As described above, the load on the data line ranges about 1.0A from about 0.75A to about 1.75A when there is no cutout of the common electrode on the data line, while it ranges about 0.07A from about 0.43A to about 0.5A when the common electrode has a cutout on the data line. Concerning the coupling between the data line and other signal lines, the variation of the capacitive load due to the behavior of the liquid crystal molecules is lower than about 15% compared with the case having no overlapping cutout.

The structures according to embodiments of the present invention also reduce light leakage due to the lateral crosstalk, which is described in detail with reference FIGS. 6–9.

As described above, the removal of the portions of the common electrode decreases the strength of the electric field near the data line. Accordingly, the effect of the data signal flowing in the data line on the orientations of the liquid crystal molecules near the data lines is reduced and thus the light leakage near the data line is also reduced.

Figure 6:
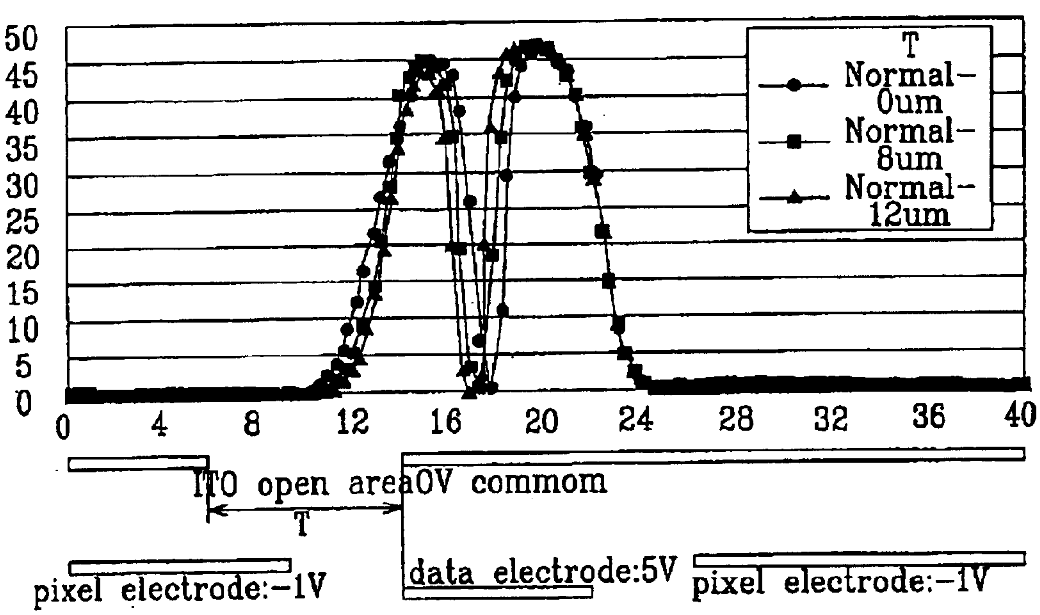
FIG. 6 is a graph illustrating the light leakage near a data line of an LCD having a cutout of a common electrode offset from the data line.
Figure 7:
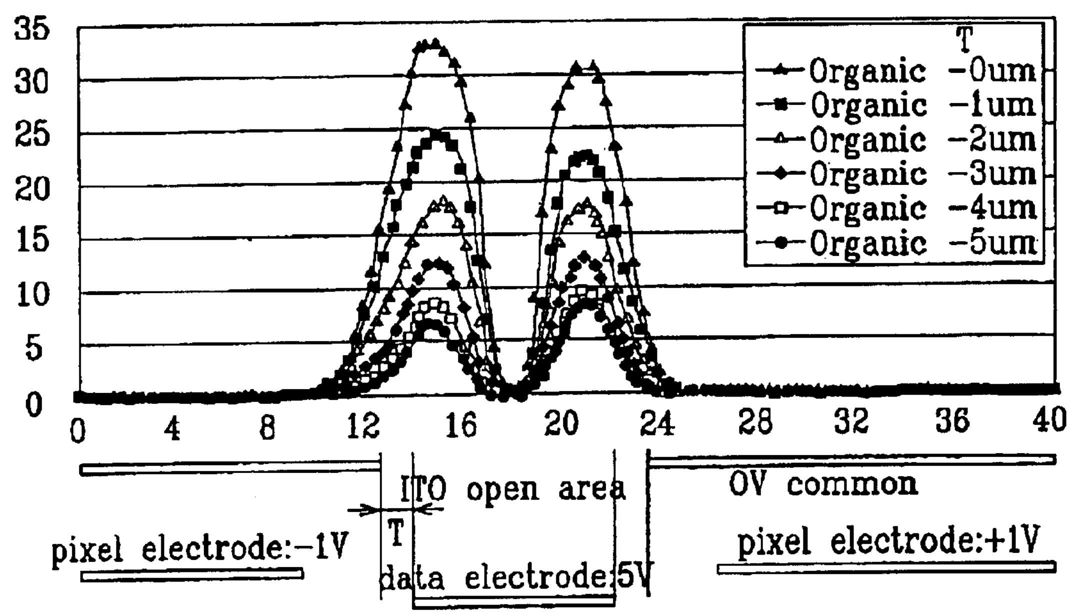
FIGS. 7 and 8 are graphs illustrating the light leakage near a data line of an LCD having a cutout of a common electrode facing the data line.
Figure 8:
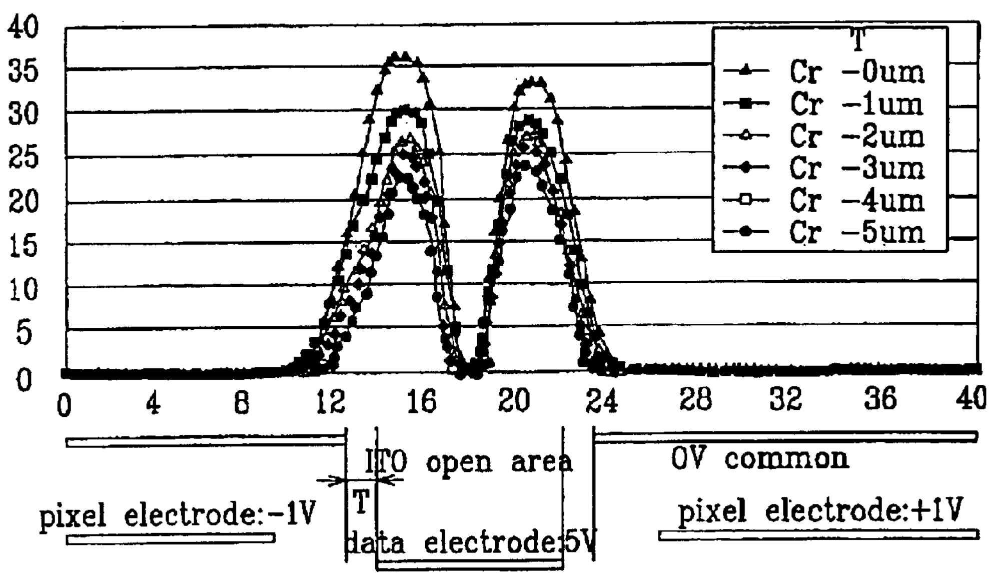

FIG. 6 is a graph illustrating the light leakage in candela (Cd) near a data line of an LCD having a cutout of a common electrode offset from the data line, and FIGS. 7 and 8 are graphs illustrating the light leakage near a data line of an LCD having a cutout of a common electrode facing the data line. The LCDs shown in FIGS. 7 and 8 include black matrices made of organic material and Cr, respectively.

The common electrode was supplied with 0V, the data line was supplied with 5V, and left and right pixel electrodes were supplied with −1V and 1V, respectively. Reference numeral Z shown in FIG. 6 indicates the width of the cutout. The cutout shown in FIGS. 7 and 8 is wider than the data line and reference numeral T indicates the planar distance between an edge of the cutout and an adjacent edge of the data line.

As shown in FIG. 6, the light leakage is almost constant irrespective of the width of the cutout. It means that the cutout offset from the data line may not significant contribution to the reduction of the light leakage.

As shown in FIGS. 7 and 8, the light leakage is reduced as the distance T is increased. In particular, the organic black matrix significantly reduces the light leakage depending on the distance T. It means that the cutout on the data line reduces the lateral light leakage near the data line.

Figure 9:
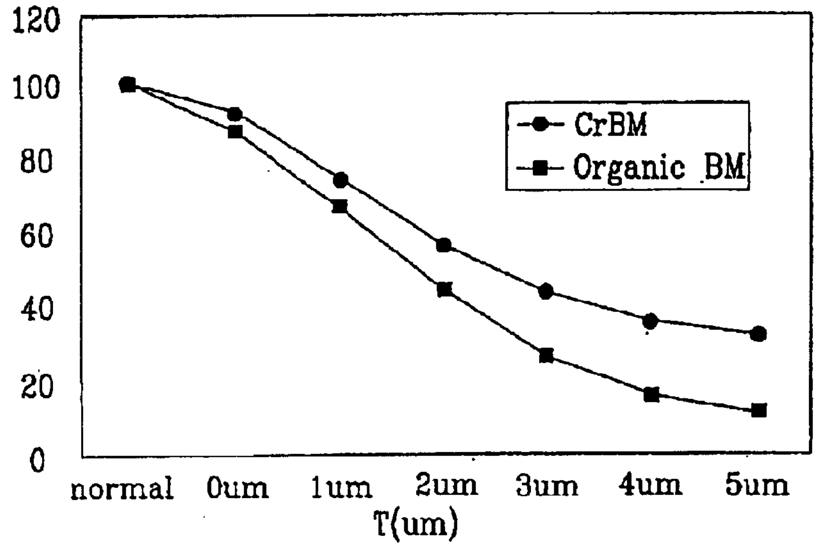
FIG. 9 is a graph showing the total light leakage for Cr black matrix and organic black matrix as function of the distance T defined in FIGS. 7 and 8.

FIG. 9 is a graph showing the total light leakage for Cr black matrix and organic black matrix as function of the distance T defined in FIGS. 7 and 8. The total light leakage is defined as an integration of the light leakage over the position, that is, the integration of the curves along the transverse axis shown in FIGS. 7 and 8 and it is represented as a percentage of that shown in FIG. 6.

As shown in FIG. 9, the light leakage becomes reduced as the distance T becomes large. It means that the cutout of the common electrode can reduce the lateral crosstalk. FIG. 9 also shows that the organic black matrix enhances the reduction of the light leakage as expected.

If the distance T is designed to be equal to about four microns, the light leakage is lower than about 50% of the structure shown in FIG. 6 regardless of the alignment error.

The structures according to embodiments of the present invention increase the aperture ratio, which is described in detail.

Figure 10:
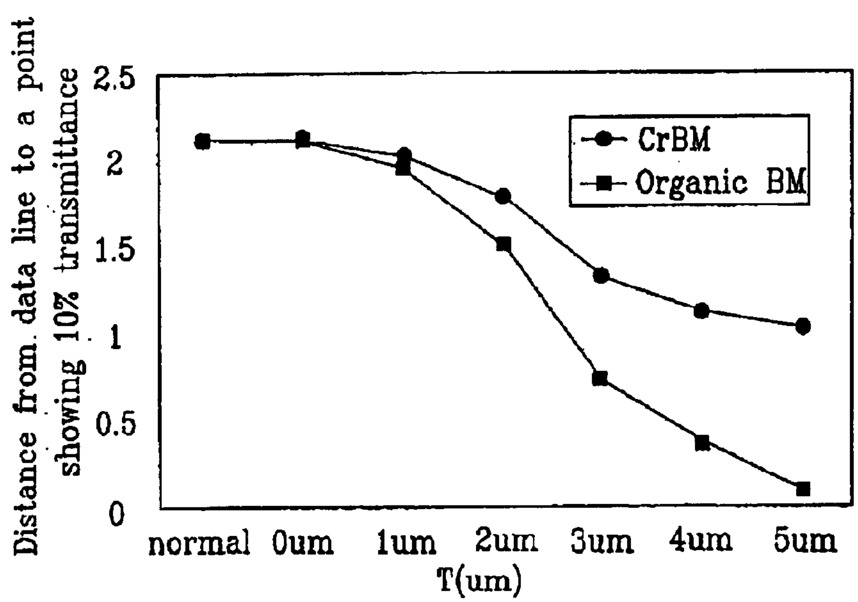
FIG. 10 is a graph illustrating a distance from a data line to a position showing 10% transmittance of light leaked near the data line.

FIG. 10 is a graph illustrating a distance from a data line to a position showing 10% transmittance of light leaked near the data line, which is represented as a ratio to that in the LCD shown in FIG. 6.

As shown in FIG. 10, the position showing 10% of the light transmittance becomes close as the distance T increase. Here, 10% is the value compared with the transmittance of light in a white state view from a front side. Accordingly, a black matrix provided for light leakage near the data line can be reduced by about one to two microns.

While the present invention has been described in detail with reference to the preferred embodiments, those skilled in the art will appreciate that various modifications and substitutions can be made thereto without departing from the spirit and scope of the present invention as set forth in the appended claims.

For example, the arrangements of the cutouts of the pixel electrodes and the common electrode may be modified and protrusions are provided instead of the cutouts.

What is claimed is:

1. A liquid crystal display comprising:

a first substrate;

a gate line formed on the first substrate;

a data line formed on the first substrate and intersecting the gate line;

first and second pixel electrodes located opposite the data line and having a plurality of first cutouts;

a thin film transistor connected to the gate line, the data line, and the first pixel electrode;

a second substrate facing the second substrate; and a common electrode formed on the second substrate and having a plurality of second and third cutouts defining a plurality of domains along with the first cutouts and facing the first and the second pixel electrodes, respectively, wherein the second and the third cutouts have portions overlapping the data line and the overlapping portions of the second and the third cutouts are alternately arranged along the data line.

2. The liquid crystal display of claim 1, wherein the second and the third cutouts are alternately arranged with the first cutouts of the first and the second pixel electrodes.

3. The liquid crystal display of claim 2, wherein the domains have two long edges extending substantially parallel to each other and make an angle of about 45 degrees with the gate line.

4. The liquid crystal display of claim 3, wherein the second cutouts include upper cutouts facing upper half of the first pixel electrode and lower cutouts facing lower half of the first pixel electrode, and at least one of the number of the upper cutouts and the number of the lower cutouts is odd.

5. A liquid crystal display comprising:

a first substrate;

a gate line formed on the first substrate and extending substantially in a first direction;

a gate insulating layer formed on the gate line;

a semiconductor layer formed on the gate insulating layer;

first and second ohmic contacts formed on the semiconductor layer;

a data line formed on the first substrate, extending in a second direction, and including a source electrode disposed on the first ohmic contact at least in part;

a drain electrode formed on the second ohmic contact at least in part;

a passivation layer formed on the data line and the drain electrode and having a contact hole exposing the drain electrode;

first and second pixel electrodes formed on the passivation layer and having a plurality of first cutouts, the first pixel electrode connected to the drain electrode through the contact hole;

a second substrate facing the first substrate;

a plurality of color filters formed on the second substrate; and a common electrode formed on the color filters and having a plurality of second and third cutouts defining a plurality of domains along with the first cutouts and facing the first and the second pixel electrodes, respectively, wherein the second and the third cutouts have portions overlapping the data line, each of the second and the third cutouts include upper cutouts facing upper half of the first or the second pixel electrodes and lower cutouts facing lower half of the first or the second pixel electrodes, and the number of the upper cutouts and the number of the lower cutouts are odd.

6. The liquid crystal display of claim 5, wherein the overlapping portions of the second and the third cutouts are alternately arranged along the data line.

7. The liquid crystal display of claim 5, further comprising a storage electrode line located on the same plane as the gate line and overlapping the first and the second pixel electrodes.

* * * * *